(12) United States Patent
Veedu et al.

(10) Patent No.: US 9,845,264 B1
(45) Date of Patent: Dec. 19, 2017

(54) HIGH TEMPERATURE COMPOSITES AND THEIR APPLICATION

(71) Applicant: Oceanit Laboratories, Inc., Honolulu, HI (US)

(72) Inventors: Vinod P. Veedu, Houston, TX (US); Ashavani Kumar, Honolulu, HI (US); Sumil Thapa, Honolulu, HI (US)

(73) Assignee: Oceanit Laboratories, Inc., Honolulu, HI (US)

(*) Notice: Subject to any disclaimer, the term of this patent is extended or adjusted under 35 U.S.C. 154(b) by 567 days.

(21) Appl. No.: 13/740,873

(22) Filed: Jan. 14, 2013

Related U.S. Application Data

(60) Provisional application No. 61/586,001, filed on Jan. 12, 2012.

(51) Int. Cl.
| | | |
|---|---|---|
| *C04B 7/02* | (2006.01) | |
| *C04B 14/06* | (2006.01) | |
| *C04B 14/34* | (2006.01) | |
| *B32B 37/15* | (2006.01) | |
| *B32B 37/24* | (2006.01) | |
| *B32B 38/00* | (2006.01) | |
| *B32B 37/12* | (2006.01) | |
| *B05D 3/00* | (2006.01) | |

(52) U.S. Cl.
CPC ........... *C04B 7/02* (2013.01); *B05D 3/007* (2013.01); *B32B 37/1284* (2013.01); *B32B 37/15* (2013.01); *B32B 37/24* (2013.01); *B32B 38/164* (2013.01); *C04B 14/06* (2013.01); *C04B 14/34* (2013.01)

(58) Field of Classification Search
CPC ..... B32B 37/15; B32B 37/24; B32B 37/1284; B32B 38/164; C04B 7/02; C04B 14/06; C04B 14/34
See application file for complete search history.

(56) References Cited

U.S. PATENT DOCUMENTS

| 4,083,729 | A | * | 4/1978 | Yamada | ............... C04B 24/003 106/677 |
|---|---|---|---|---|---|
| 4,365,021 | A | | 12/1982 | Pirooz | |
| 6,121,354 | A | | 9/2000 | Chronister | |
| 6,402,156 | B1 | | 6/2002 | Schutz | |
| 8,012,895 | B2 | | 9/2011 | Wu | |
| 8,703,842 | B1 | * | 4/2014 | Chen | ........................ C08K 3/22 523/219 |

OTHER PUBLICATIONS

Kofteros, M.; Rodriguez, S.; Tandon, V.; Murr, L.E. "A preliminary study of thermal expansion compensation in cement by ZrW2O8 additions". Scripta Materialia. vol. 45. Iss. 4. pp. 369-374. Aug. 31, 2001. Retrieved from http://www.sciencedirect.com/science/article/pii/S1359646201010090.*

Castro, Joseph. "What is Sand?" May 28, 2013. Retrieved from http://www.livescience.com/34748-what-is-sand-beach-sand.html.*

"Manufactured Sand (M-Sand) in Construction". The Consutructor. Retrieved from http://theconstructor.org/building/manufactured-sand-m-sand-in-construction/8601/.*

"Granite". Geology. Retrieved from http://geology.com/rocks/granite.shtml.*

* cited by examiner

*Primary Examiner* — Anthony J Green
(74) *Attorney, Agent, or Firm* — James Creighton Wray; Meera P. Narasimhan (57) ABSTRACT

A high temperature composite includes a binder, cement or geopolymer and ceramic filler, negative coefficient of thermal expansion materials of $AM_2O_8$ or $A_2(MO_4)_3$ family or $ZrV_2O_7$. The material is compatible with concrete, any ceramics or metals or metal alloy. The material is heat shock resistant and stable in harsh chemical environments and is impermeable to most solvents. The new sealant materials can be used as sealants, heat shock resistant structural materials and coatings.

20 Claims, 7 Drawing Sheets

HIGH TEMPERATURE COMPOSITES AND THEIR APPLICATION

This application claims the benefit of U.S. Provisional Application No. 61/586,001, filed Jan. 12, 2012, which is hereby incorporated by reference in its entirety as if fully set forth herein.

FIELD OF THE INVENTION

The present invention relates to the field of high temperature coating, pavement concrete joints, sealant and materials for blast furnaces, and shielding materials for nuclear reactors.

BACKGROUND OF THE INVENTION

There are two types of sealant materials currently available for high temperature application: silicon based materials and glass based sealant materials.

Glass-ceramics, derived from "invert" alkali earth silicate glasses, are used as sealing materials for solid oxide fuel cell applications. The glass based ceramics materials are borosilicate glass-ceramics, boron-free alkaline earth silicates, and phospho-silicate glass-ceramics, which can withstand up to 800° C.

The silicon based ceramics are manufactured by various companies such as Dow Corning, Insulflex, and Cytec. These materials are stable up to 600° F. Some of the materials react or decompose in organic solvent, ultraviolet light and other chemicals. Currently silicon based materials have been used to seal the concrete joints.

These existing sealant materials are not stable at high temperature and decompose in harsh chemical environments.

Needs exist for improved high temperature sealant materials.

SUMMARY OF THE INVENTION

The present invention provides a high temperature composite that includes a binder, cement or geopolymer and ceramic filler, negative thermal expansion materials such as zirconium tungstate. The material is compatible with concrete, any ceramics and metal. The material is heat shock resistant and stable in harsh chemical environments and is impermeable to most solvents. The new sealant materials can be used as sealants, heat shock resistant structural materials and coatings.

The new ceramics based sealant materials are stable up to 1,000° C., which is much higher than existing capabilities technologies. The new sealant materials are robust in most chemical environments. The new sealant materials are impermeable to water and oils. The new sealant materials do not degrade under UV radiation.

These and further and other objects and features of the invention are apparent in the disclosure, which includes the above and ongoing written specification, with the claims and the drawings.

BRIEF DESCRIPTION OF THE DRAWINGS

FIG. 7A-C show lab testing at 500° F. in FIG. 7A, and a specimen before heating in FIG. 7B and the specimen after heating at 500° F. in FIG. 7C.

DETAILED DESCRIPTION OF THE DRAWINGS

The invention is based on compensating for the expansion of pavement concrete with a matching contraction of cement-zirconium tungstate (CZT) composites in the joints. To achieve this, the coefficient of thermal expansion (CTE) of the composite should be lower or a match to the positive CTE of concrete ($7\text{-}12 \times 10^{-6}/°$ C.). The required value was achieved by adding negative CTE materials to a cement matrix. The expected coefficient of thermal expansion was estimated using Turner's model shown in Table 1. Based on these estimations, cement-quartz (Q1), cement-quartz-zirconium tungstate (Q-ZT-2) and cement-zirconium tungstate (ZT3) were considered as shown in Table 2.

Figure 1A:
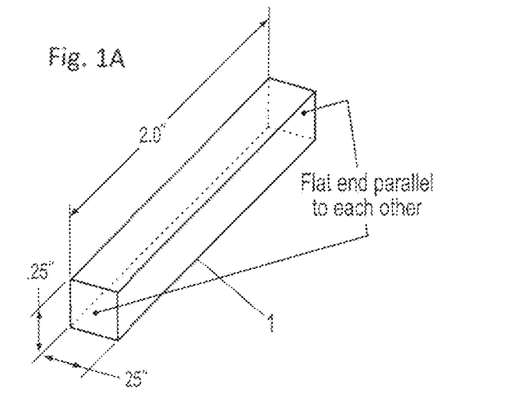
FIGS. 1A-1E depict the shape of the specimen in FIG. 1A, a synthesis protocol for manufacturing the sealant materials in FIG. 1B, fabrication of a cement based specimen in FIG. 1C, prefabricated specimens in FIG. 1D and cross sectional view of the specimen in FIG. 1E.

As shown in FIG. 1A, specimens having 2"×0.25" square cross sections and ends flat and parallel to within 0.001 inch were fabricated as per ASTM E228-06, "Standard Test Method for Linear Thermal Expansion of Solid Materials".

Figure 1B:
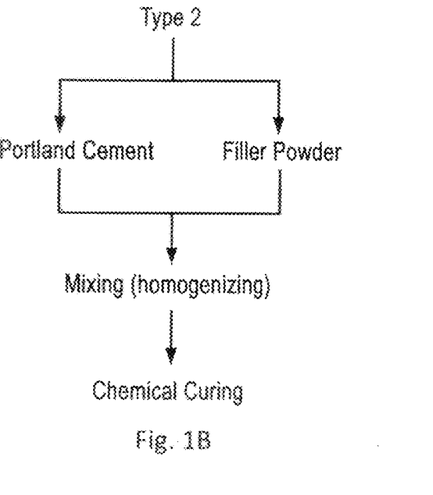

The general synthesis scheme for making the sealant materials is summarized in FIG. 1B. Three different types of sealant material specimens 1 were prepared: cement quartz (Q1), cement quartz zirconium tungstate (Q-ZT-2) and cement zirconium tungstate (ZT3). The sample materials were mixed with water for 10 minutes to make pastes. The water content was varied to obtain consistencies suitable for molding.

Figure 1C:
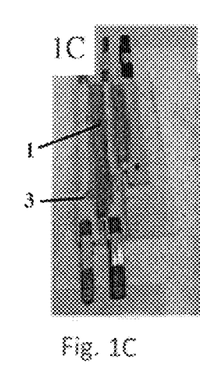
Figure 1D:
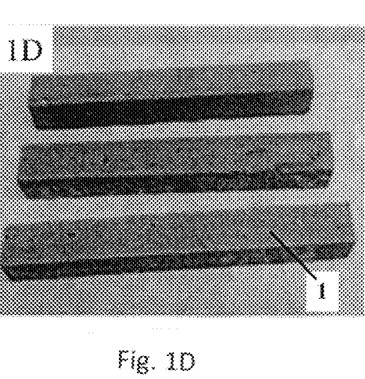
Figure 1E:
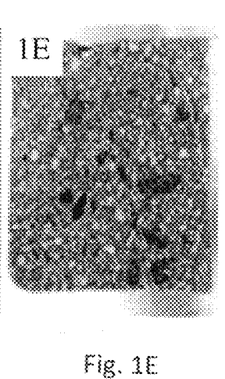

The pastes were placed in a wood mold 3 and cured at 100% humidity for 4 days as shown in FIG. 1C. The specimens 1 were extracted from the mold 3 as shown in FIG. 1D and were tested without further processing. FIG. 1E is a cross-sectional view of specimen 1.

Figure 2A:
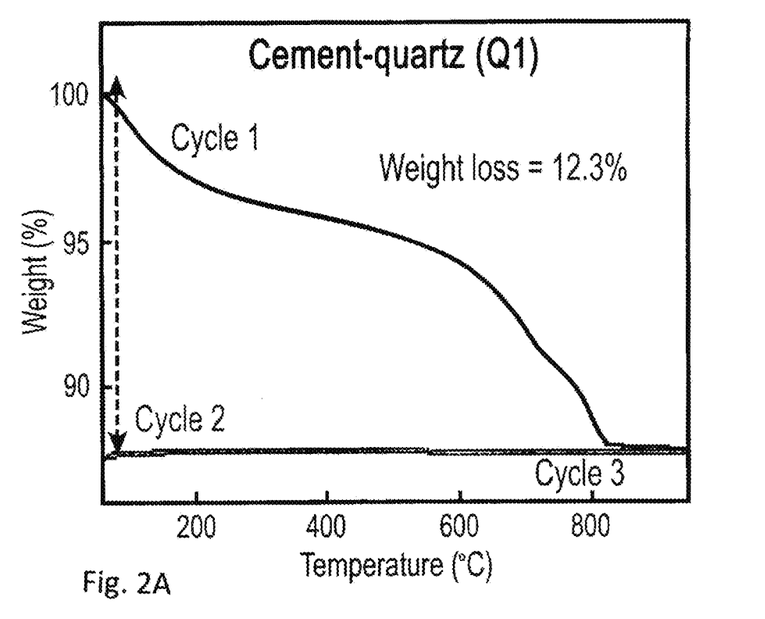
FIGS. 2A-C are graphs of the thermo-gravimetric analysis (TGA) data, showing normalized weight as a function of temperature.
Figure 2B:
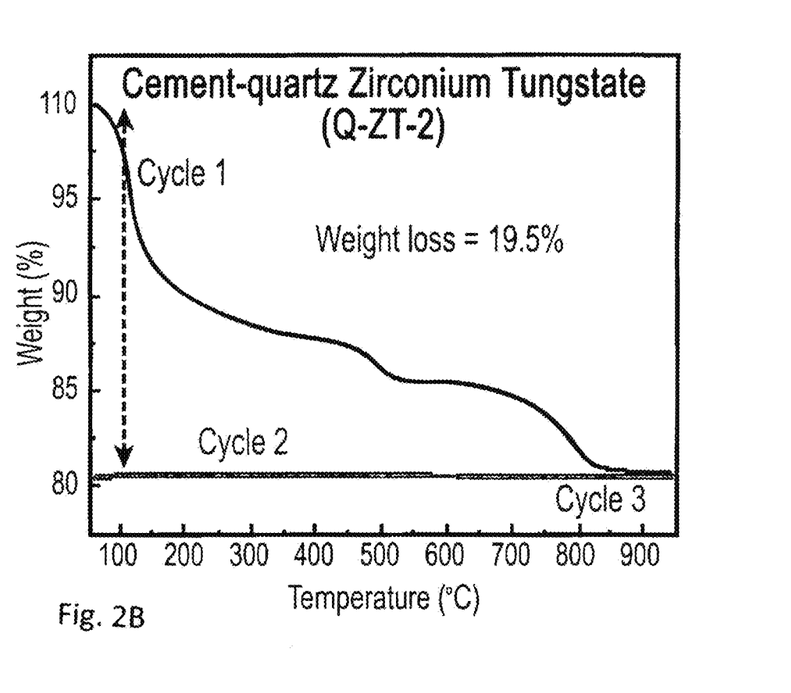
Figure 2C:
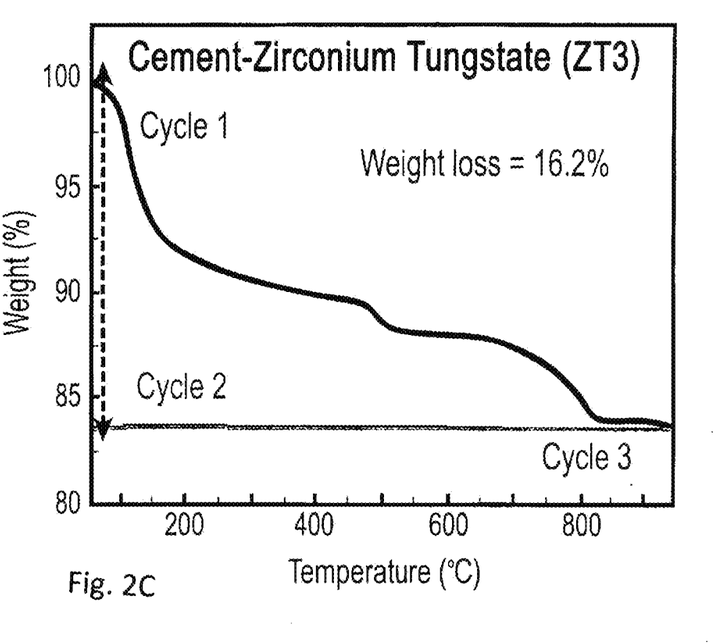

The composites were thoroughly characterized. Thermogravimetric analysis (TGA) was used to study the thermal stability of materials, in all three specimens on heating as shown in FIGS. 2A-C. The overall mass losses for cement quartz, cement quartz zirconium tungstate and cement zirconium tungstate were 12.3%, 19.5% and 16.2%, respectively, during the first cycle with no significant change observed in subsequent cycles. The cement-quartz specimen shows two steps, 3% from room temperature to 200° C. and 9.3% from 600 to 1000° C. Cement-quartz-zirconium tungstate and cement-zirconium tungstate show ~10%, ~4%, ~6% mass loss in the 100-200° C., 450-500° C. and 600-1000° C. ranges. The changes in the low-temperature and high-temperature ranges can be attributed to trapped moisture and decomposition of a structural hydroxyl group on the specimen surface respectively.

Figure 3A:
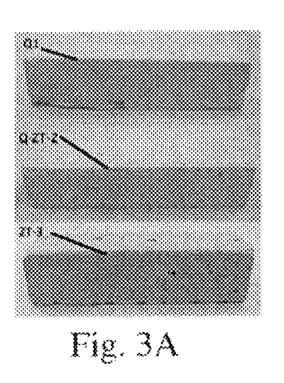
FIGS. 3A and 3B show specimens in FIG. 3A and a graph of the change in volume as a function of thermal cycle in FIG. 3B.
Figure 3B:
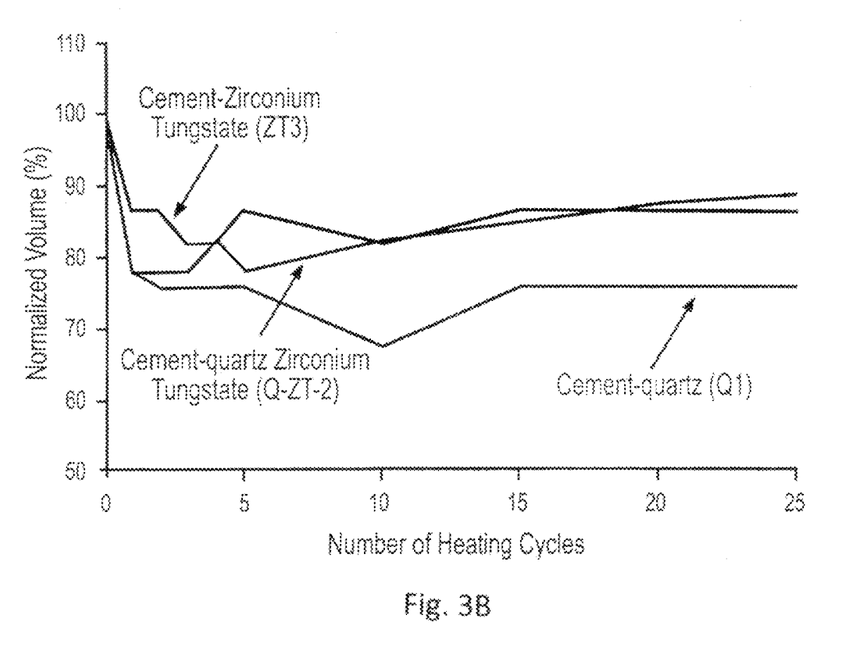

The shrinkage and surface changes for Q1, Q-ZT-2 and ZT3 were examined by placing a 40×10×10 mm in an open air box furnace, heating the specimens to 1,000° C. and then allowing the specimens to cool to room temperature. Volume reductions of 24%, 12% and 14% were observed after 25 cycles in Q1, Q-ZT-2 and ZT3, respectively, as shown in FIGS. 3A-C. The first cycle resulted in maximum shrinkage in agreement with mass-loss data. The reduction was due to evaporation of water and consequent shrinkage of the matrix. Both are known characteristics of cement materials. Specimens of Q1 and Q-ZT-2 exhibited numerous stress cracks. These cracks are considered normal and can be avoided by modifying material composition.

Figure 4:
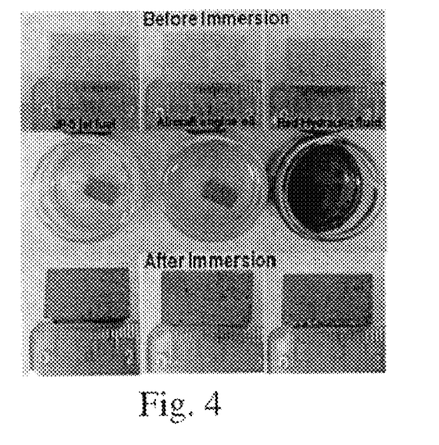
FIG. 4 shows a chemical resistivity test of cement-zirconium tungstate.

Chemical stability of specimens 1 was determined by exposure to Anderol ROYCO 782 Hydraulic Fluid (MIL-H-83282), AeroShell Turbine Oil 500 (MIL-L-23699), and JP-5 jet fuel (FIG. 4). All the samples showed negligible change in volume and no visible physical or chemical change. The increase in weight of 6.5-8% was observed in the specimens. The weight increases can be attributed to absorption of fluid into the pores of the specimens 1 as shown in Table 3.

Figure 5:
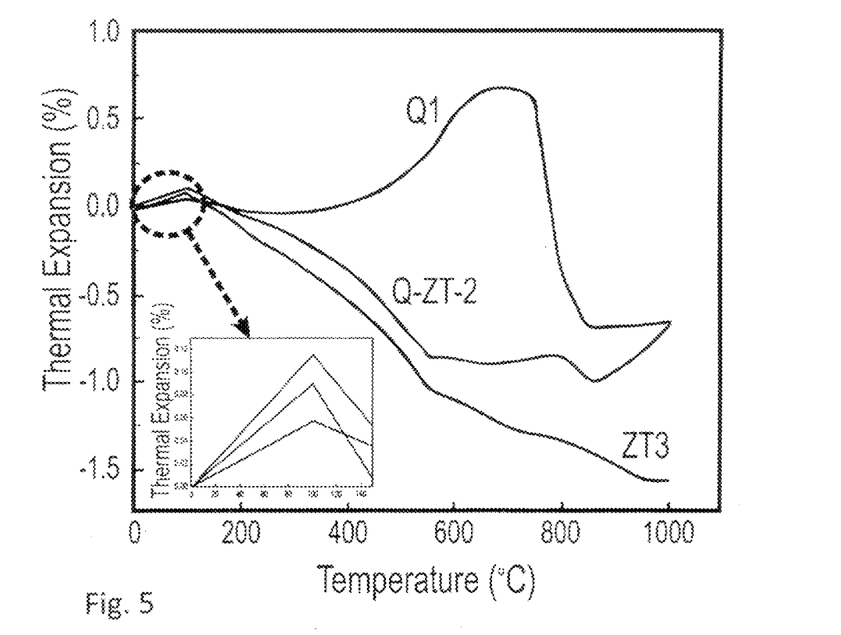
FIG. 5 shows the thermal expansion of specimens 1 as a function of temperature.

Thermal expansion of the samples was measured as a function of temperature as shown in FIG. 5. Q-ZT-2 and ZT-3 expanded from 20° C. to 100° C. and contracted from 100° C. to 1,000° C. The average coefficient of thermal expansion (CTE) was estimated based on a linear best-fit analysis of the data and listed in Table 4. The CTE of ZT3 specimen is found to be $8.9 \times 10^{-6 \circ}$ C.$^{-1}$ for 20-100° C. and $-18 \times 10^{-6 \circ}$ C.$^{-1}$ in 100-1,000° C. temperature range. Those results showed a 40% less positive and 44% less negative CTE compared to the equivalent ranges in pure cement. The CTE of ZT3 is thus found to be in the desired range for concrete expansion joints.

Figure 6A:
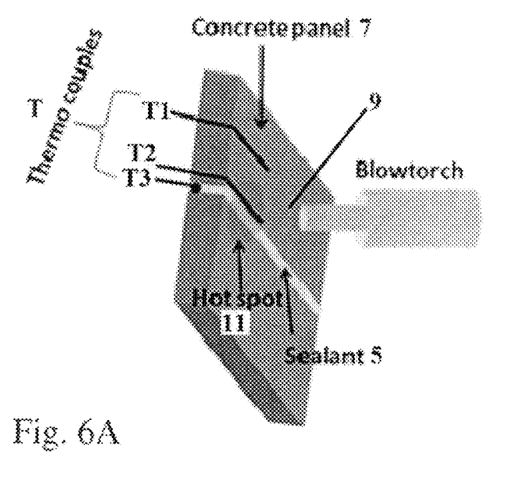
FIGS. 6A and 6B show a schematic in FIG. 6A and lab setup in FIG. 6B for a simulated exhaust test.
Figure 6B:
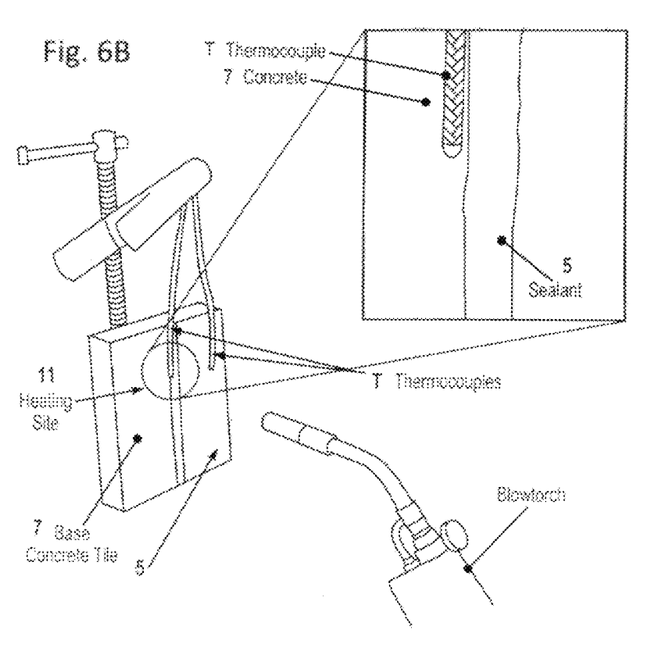

As shown in FIG. 6A, in order to examine the stability of sealant materials 5, tests were performed involving exposure of concrete panels 7 to gas flames 9 at 550±50° F. and 1,700° F. The test was used to study the thermal stability of specimens. FIG. 6B shows the laboratory set up with the concrete panels 7, the sealant 5, thermocouple 11 and the blow torch 13.

Figure 7A:
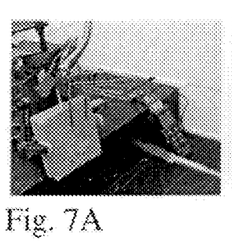
Figure 7B:
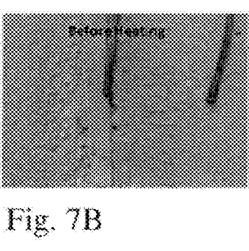
Figure 7C:
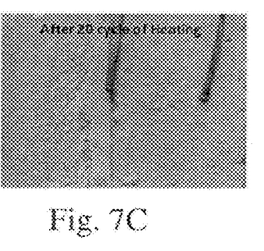

Unreinforced 6×6×1 inch Portland cement concrete (PCC) panels were fabricated and used as shown in FIGS. 7A-C. A slot 0.25 inch wide and 0.50 inch deep was cut and filled with sealant. The samples were cured at 100% humidity for 4 days. The panels were clamped facing a gas flame 9 with thermocouples 11 installed at various locations on the sealant 5, within the sealant and on the concrete 7 two inches away from the hottest spot 15, as shown in FIGS. 7A-C.

In a typical test, the sealant surface was maintained at either ~500° F. for 15 minutes or 1,700° F. for 20 seconds. After each exposure, the specimen 1 was visually inspected to document change in material appearance or loss of adhesion as shown in FIG. 7C. Measurements were repeated twenty times to evaluate long-term durability of the material.

Figure 8A:
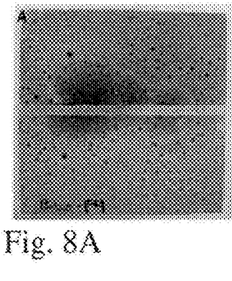
FIGS. 8A-C show results of lab testing at 1700° F. of cement-zirconium tungstate (ZT3).
Figure 8B:
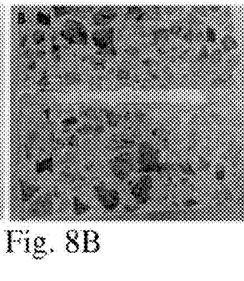
Figure 8C:
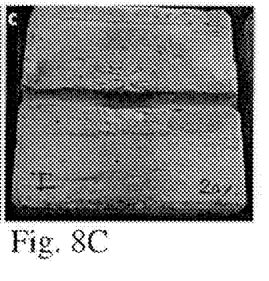

No loss of material or adhesion was observed in the heated zone 17 as shown in FIG. 8. No flame, charring or physical change was observed on the sealant 5, suggesting that the sealant material retains its original physical properties. Preliminary studies show that the CZT composite outperforms existing polymer-based sealant materials.

While the invention has been described with reference to specific embodiments, modifications and variations of the invention may be constructed without departing from the scope of the invention, which is defined in the following claims.

TABLE 1

Formulation for concrete joint sealant composite.

| Form- ulations | Type of glass | glass/cement Vol. % | Wt. % | ZT Vol. % | Wt. % | CTE(/° C.) |
|---|---|---|---|---|---|---|
| 1 | Cement/quartz | 22/78% | 25/75% | 0% | 0% | $-9.63 \times 10^{-6}$ |
| 2 | Cement/quartz | 93% | 89% | 7% | 11% | — |
| 3 | Cement | 83% | 75% | 17% | 25% | $-28 \times 10^{-6}$ |
| 4 | Cement | 63% | 51% | 37% | 49% | $-23 \times 10^{-6}$ |
| 5 | Cement | 53% | 41% | 47% | 59% | $-21 \times 10^{-6}$ |

TABLE 2

Cement based formulations mix ratios.

| Component | Formulation 1 Q1 (g/wt. %) | | Formulation 2 (C-Q-ZT-2) (g/wt. %) | | Formulation 3 (ZT3) (g/wt. %) | |
|---|---|---|---|---|---|---|
| Cement(g) | 83 g | 26.5% | 166 g | 59% | 166 g | 59% |
| Quartz(g) | 230 g | 73.5% | 57.5 g | 20.5% | 0 g | 0% |
| Zirconium Tungstate(g) | 0 g | 0% | 57.5 g | 20.5% | 115 g | 41% |
| Water(g) | 150 g | — | 150 g | — | 75 g | — |

TABLE 3

Quantitative analysis of specimens in various chemical environments.

| Types of Chemical | Cement-quartz-Zirconium Tungstate | | Cement-Zirconium Tungstate | |
|---|---|---|---|---|
| | Wt. Change (%) | Vol. Change (%) | Wt. Change (%) | Vol. Change (%) |
| JP-5 jet fuel | 7.0 | 0 | 7.1 | 0 |
| AeroShell Turbine Oil 500 | 8.0 | 0 | 7.5 | 0 |
| Anderol ROYCO 782 Hydraulic Fluid | 7.7 | 0 | 6.5 | 0 |

TABLE 4

Coefficient of thermal expansion of various materials.

| Materials | Temperature (° C.) | CTE ($\times 10^{-6}$ ° C.$^{-1}$) |
|---|---|---|
| Cement-Quartz-Zirconium Tungstate | 20-100 | 11 |
| | 100-1000 | -8.85 |
| Cement-zirconium Tungstate | 20-100 | 8.94 |
| | 100-1000 | -18.5 |
| Concrete | 20-1000 | 7.2 |
| Cement | 20-150 | 14.8 |
| | 150-871 | -32.8 |

We claim:

1. A product comprising a sealant material comprising a binder, a ceramic filler and a family of negative thermal expansion coefficient materials, wherein the family of negative thermal expansion coefficient materials is selected from the group consisting of $AM_2O_8$ or $A_2(MO_4)_3$ wherein (A=Zr or Hf, M=Mo or W), $ZrV_2O_7$, and combinations thereof, wherein the binder is selected from cement, geopolymer, polymer, metal, and combinations thereof, and wherein the family of negative thermal expansion coefficient materials is greater than 40% up to 59% of a combination of the binder, the ceramic filler and the family of negative thermal expansion coefficient materials.

2. The product of claim 1, wherein the sealant material is resistant to very high or very low temperature.

3. The product of claim 1, wherein the sealant material is adapted for use in fuel cell technology, transportation, defense and space structures, concrete roads or bridges, aircraft runways, missile and satellite launching pads and pads for vertical takeoff and landing.

4. The product of claim 1, wherein the sealant material is adapted for high temperature applications and uses in aircraft runway, pavement, insulation and shielding materials in nuclear power plants.

5. The product of claim 1, wherein the sealant materials is adapted for corrosive chemical application and uses in liquid gas storage or equipment facility, fuel or chemical storage facility.

6. The product of claim 1, wherein the binder and ceramic filler which further comprises materials of $AM_2O_8$ or $A_2(MO_4)_3$ family or $ZrV_2O_7$ is made by blending the binder and the filler in powder form, mixing the binder and the filler, homogenizing the binder and the filler, creating a paste and applying the paste between elements to be sealed.

7. The product of claim 1, wherein the binder and ceramic filler which further comprises materials of $AM_2O_8$ or $A_2(MO_4)_3$ family or $ZrV_2O_7$ is made by blending the binder and the filler in powder form, mixing the binder and the filler, homogenizing the binder and the filler, creating a paste and forming the paste into inserts, and drying and curing the inserts for use between articles to be sealed.

8. The product of claim 2, wherein the binder is Portland cement, silicates, polymers, siloxane, or metals.

9. The product of claim 8, wherein the Portland cement and ceramic filler which further comprises materials of $AM_2O_8$ or $A_2(MO_4)_3$ family or $ZrV_2O_7$ is made by blending the Portland cement and the filler in powder form, mixing the Portland cement and the filler, homogenizing the Portland cement and the filler, creating a paste and applying the paste between elements to be sealed.

10. The product of claim 8, wherein the Portland cement and ceramic filler which further comprises materials of $AM_2O_8$ or $A_2(MO_4)_3$ family or $ZrV_2O_7$ is made by blending the Portland cement and the filler in powder form, mixing the Portland cement and the filler, homogenizing the Portland cement and the filler and creating a paste.

11. The product of claim 1, wherein the binder and ceramic filler which further comprises materials of $AM_2O_8$ or $A_2(MO_4)_3$ family or $ZrV_2O_7$ is made by blending the binder and the filler in powder form, mixing the binder and the filler, homogenizing the binder and the filler, melting it to liquid and pouring the liquid between elements to be sealed.

12. The product of claim 1, wherein the binder and ceramic filler which further comprises materials of $AM_2O_8$ or $A_2(MO_4)_3$ family or $ZrV_2O_7$ is made by blending the binder and the filler in powder form, mixing the binder and the filler, homogenizing the binder and the filler, making a dispersing in solvent and spraying the liquid between elements to be sealed.

13. The product of claim 1, wherein the material is compatible with concrete, polymers, plastic, metal or metal alloy and ceramics and is adapted for use in sealants, heat shock resistant structural materials or coatings.

14. A process for making a sealant material, comprising mixing a powdered or liquid binder and a powdered or liquid filler material, further comprising mixing greater than 40% up to 59% of total content of a family of negative thermal expansion coefficient materials selected from the group consisting of $AM_2O_8$ or $A_2(MO_4)_3$ family, wherein (A=Zr or Hf, M=Mo or W), or $ZrV_2O_7$, and combinations thereof, mixing the powdered binder and filler, homogenizing the mixed powdered or liquid binder and filler into a paste, liquid or dispersion and applying the paste liquid or dispersion and wherein the binder is selected from cement, geopolymer, polymer, metal, and combinations thereof.

15. The process of claim 14, wherein the applying the paste or liquid or dispersion comprises applying the paste or liquid or dispersion between objects as a sealant material, applying the paste or liquid or dispersion to forms of structural material, applying the paste or liquid or dispersion as a heat shock resistant material to structural materials or applying the paste or liquid or dispersion to forms, or molding sealant material and applying the sealant material between objects, and further comprising curing and drying the paste or liquid or dispersion.

16. The process of claim 14, further comprising hydrating the binder, and wherein the mixing further comprises mixing the powdered filler with the hydrated binder.

17. The process of claim 14, further comprising liquid the binder, and wherein the mixing further comprises mixing the powdered or liquid filler with the binder.

18. The process of claim 14, further comprising hydrating the mixed powders.

19. The process of claim 14, further comprising hydrating the homogenized powders.

20. The process of claim 14, further comprising chemical crosslinking the homogenized powders or liquid.

* * * * *